(12) United States Patent
Wang et al.

(10) Patent No.: US 8,892,088 B2
(45) Date of Patent: Nov. 18, 2014

(54) SYSTEMS AND METHODS FOR HANDLING INCOMING CALLS ON A MEDIA DEVICE

(75) Inventors: Huaiyuan Wang, Cary, NC (US); Rodney Owen Williams, Cary, NC (US)

(73) Assignee: HTC Corporation, Taoyuan, Taoyuan County (TW)

(*) Notice: Subject to any disclaimer, the term of this patent is extended or adjusted under 35 U.S.C. 154(b) by 39 days.

(21) Appl. No.: 13/328,484

(22) Filed: Dec. 16, 2011

(65) Prior Publication Data
US 2013/0157631 A1    Jun. 20, 2013

(51) Int. Cl.
*H04M 3/00* (2006.01)

(52) U.S. Cl.
USPC .......................................... 455/420; 455/415

(58) Field of Classification Search
USPC ................ 455/41.2–41.3, 411–412.2; 700/94
See application file for complete search history.

(56) References Cited

U.S. PATENT DOCUMENTS

| | | | |
|---|---|---|---|
| 2005/0027385 A1* | 2/2005 | Yueh ............................... | 700/94 |
| 2005/0181826 A1* | 8/2005 | Yueh .......................... | 455/556.2 |
| 2006/0199537 A1* | 9/2006 | Eisenbach .................... | 455/41.2 |
| 2007/0142025 A1* | 6/2007 | Alden .......................... | 455/403 |
| 2007/0173232 A1* | 7/2007 | Kuo et al. .................... | 455/412.2 |
| 2007/0206829 A1* | 9/2007 | Weinans et al. ............... | 381/370 |
| 2007/0238484 A1* | 10/2007 | Liu ............................... | 455/557 |
| 2008/0076390 A1* | 3/2008 | Zhu et al. ...................... | 455/411 |
| 2008/0242365 A1* | 10/2008 | Rokusek et al. ........... | 455/569.1 |
| 2009/0053997 A1* | 2/2009 | Jobling et al. ............... | 455/41.2 |
| 2009/0061769 A1* | 3/2009 | Zimbric et al. ............... | 455/41.2 |
| 2009/0124281 A1* | 5/2009 | Takamune et al. .......... | 455/550.1 |
| 2009/0186580 A1* | 7/2009 | Kim .............................. | 455/41.3 |
| 2009/0197524 A1* | 8/2009 | Haff et al. ..................... | 455/3.06 |
| 2010/0045928 A1* | 2/2010 | Levy ............................. | 351/158 |
| 2010/0067723 A1* | 3/2010 | Bergmann et al. ............ | 381/315 |
| 2010/0227631 A1* | 9/2010 | Bolton et al. ................. | 455/466 |
| 2010/0304674 A1* | 12/2010 | Kim et al. ..................... | 455/41.2 |
| 2011/0081859 A1* | 4/2011 | Chung .......................... | 455/41.2 |
| 2011/0117851 A1* | 5/2011 | Kim .............................. | 455/41.3 |
| 2012/0135686 A1* | 5/2012 | Yang et al. .................... | 455/41.2 |
| 2012/0238330 A1* | 9/2012 | Wu .............................. | 455/569.1 |
| 2012/0242510 A1* | 9/2012 | Choi et al. .................... | 340/988 |

FOREIGN PATENT DOCUMENTS

CN            2788458 Y        6/2006

OTHER PUBLICATIONS

English translation of abstract of CN 2788458 Y (published Jun. 14, 2006).
China Office Action dated Jul. 22, 2014.

* cited by examiner

*Primary Examiner* — Nathan Taylor
(74) *Attorney, Agent, or Firm* — McClure, Qualey & Rodack, LLP

(57) ABSTRACT

Various embodiments for handling an incoming call are disclosed. One embodiment is a method implemented in a media playback device. The method comprises establishing, by the media playback device, a connection with an output device and streaming, by the media playback device, audio content to the output device. The method further comprises receiving, by the media playback device, an indication from a communication device of an incoming call received by the communication device and responsive to receiving the indication, providing, by the media playback device, an alert corresponding to the incoming call.

22 Claims, 10 Drawing Sheets

SYSTEMS AND METHODS FOR HANDLING INCOMING CALLS ON A MEDIA DEVICE

BACKGROUND

With the rapid development in communications technology, mobile devices have become an integral part of many people's lives given the portability and the growing number of applications available on mobile devices. Today, individuals can perform a wide range of functions such as playing music, viewing photos, etc. via mobile devices. There is an ever-increasing desire to increase the functionality and efficiency of mobile devices.

SUMMARY

Briefly described, one embodiment, among others, is a method implemented in a media playback device. The method comprises establishing, by the media playback device, a connection with an output device and streaming, by the media playback device, audio content to the output device. The method further comprises receiving, by the media playback device, an indication from a communication device of an incoming call received by the communication device and responsive to receiving the indication, providing, by the media playback device, an alert corresponding to the incoming call.

Another embodiment is a method that comprises establishing, by a media playback device, a Bluetooth Advanced Audio Distribution Profile (A2DP)/Audio Video Remote Control Profile (AVRCP) connection with an output device and streaming, by the handheld media playback device, audio content to an output device via the A2DP connection. The method further comprises receiving, by the handheld media playback device, a caller indication (ID) packet from a communication device corresponding to an incoming call received by the communication device and responsive to receiving the indication, providing, by the handheld media playback device, a visual and/or vibration alert corresponding to the incoming call, the visual alert including information derived from in the caller ID packet.

Another embodiment is a system that comprises a handheld media playback device and an application executable in the handheld media playback device. The application comprises logic that streams audio content to a hands-free device, logic that receives an indication from a communication device of an incoming call received by the communication device, logic that provides, responsive to receiving the indication, an alert to the handheld media playback device itself corresponding to the incoming call. The application further comprises logic that provides a user interface, wherein the user interface comprises items corresponding to specifics of the incoming call, actions for handling the incoming call and logic that receives a selection of one of the items.

Another embodiment is a method implemented in a media playback device for accessing data. The method comprises authenticating a user of a media playback device by establishing, by the media playback device, a connection or pairing with a trusted device external to the media playback device and thus enabling access by the media playback device, to private data from a restricted storage area within the media playback device and hidden from unauthenticated users of the handheld media playback device upon successful authentication.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
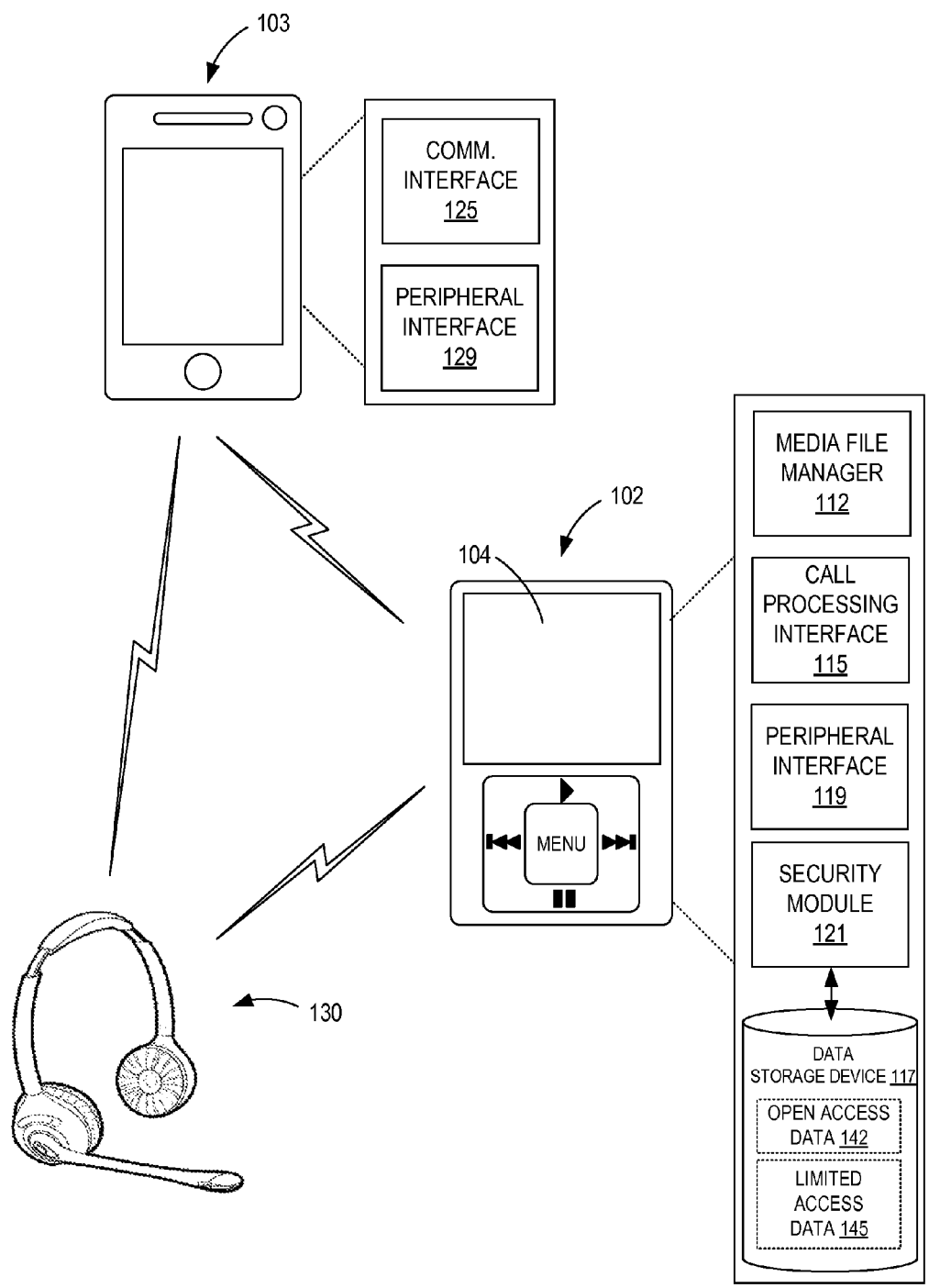
FIG. 1 is a block diagram of an environment in which embodiments of a media playback device may be implemented.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

With the rapid development in communications technology, mobile devices have become an integral part of many people's lives given the portability and the growing number of applications available on mobile devices. Today, individuals can perform a wide range of functions such as playing music, viewing photos, etc. via mobile devices. Consider a scenario whereby a user is listening to music on a wireless headset coupled to a media playback device while the user is working out or performing some other activity. An incoming call is received by the user's phone but the user's phone is in not immediate reach (e.g., the phone is in a gym bag). In this scenario, the user misses the call and later discovers that a missed call occurred. Various embodiments are disclosed for allowing users to handle incoming calls using a media player device. In the following discussion, a general description of the system and its components is provided, followed by a discussion of the operation of the same.

FIG. 1 is a block diagram of a media playback device 102 in which embodiments for handling incoming calls disclosed herein may be implemented. The media playback device 102 may be embodied, for example, as a handheld computing device or other computing platform and includes a display 104 and an interface for receiving input from a user.

Applications and/or other functionality may be executed in the media playback device 102 according to various embodiments. The components executed on the media playback device 102 include, for example, a media file manager 112, a call processing interface 115, a peripheral interface 119, a security module 121, and other applications, services, processes, systems, engines, or functionality not discussed in detail herein.

The media file manager 112 is executed to facilitate playback/consumption of media files through the peripheral interface 119. The media file manager 112 may provide controls for performing such functions as starting, stopping, pausing, moving to the next media file in a playlist, moving to the previous media file in a sequence, and/or performing other functions relating to media content. The media file manager 112 is further configured to render a user interface on the display 104 of the media playback device 102 that presents such items as a content listing in relation to the current media consumption.

The call processing interface 115 is executed to facilitate communication with a communication device 103. For example, the call processing interface 115 receives an indication from the communication device 103 when the communication device 103 receives an incoming call. The indication may comprise, for example, caller identification (ID) information that the call processing interface 115 uses to display caller identification information on the media playback device 102. In accordance with various embodiments, the caller ID information and other items are displayed in the form of a user interface on the display 104 of the media playback device 102.

Figure 2A:
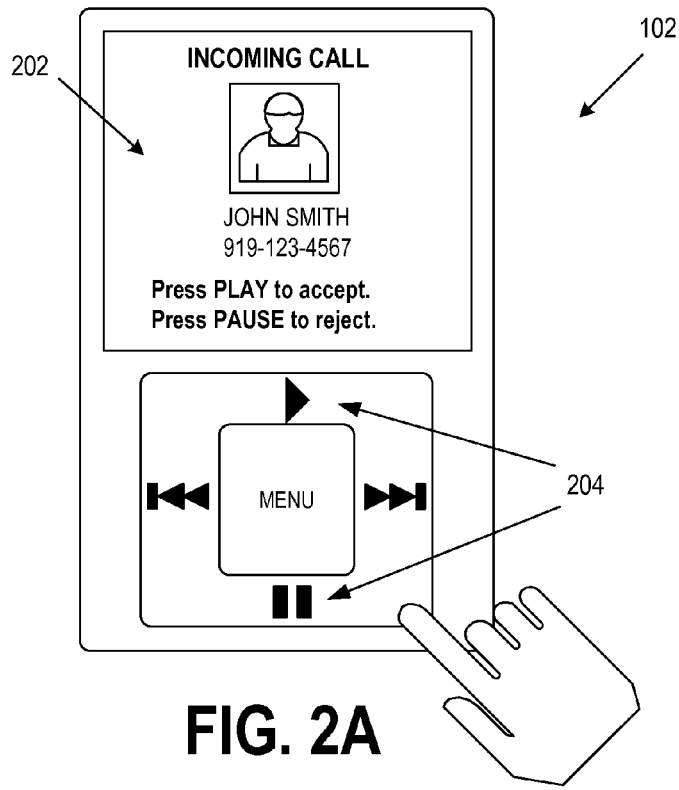
FIG. 2A illustrates an example user interface generated by the call processing interface in the media playback device of FIG. 1.

Reference is made to FIG. 2A, which illustrates an example user interface 202 generated by the call processing interface 115 (FIG. 1) in the media playback device 102 (FIG. 1). As shown, the user interface 202 includes various items, including an alert that informs the user that an incoming call has been received by the communication device 103 (FIG. 1). In accordance with various embodiments, the user interface 202 further comprises caller ID information that includes the name and or number or other information which identifies the calling party.

For some implementations, the communication device 103 may also transmit a graphic associated with the calling party, which the media playback device 102 displays on the user interface 202. However, for other implementations, graphics corresponding to a contacts list may be stored locally on the media playback device 102 and retrieved when the media playback device 102 receives an indication from the communication device 103 that an incoming call has been received. Additional details relating to the retrieval of limited access data are described below.

As shown, the user interface 202 further comprises items whereby the user can select to accept or reject the incoming call received by the communication device 103. For some embodiments, the call processing interface 115 allows the user to accept or reject the incoming call by manipulating controls 204 on the media playback device 102.

Figure 2B:
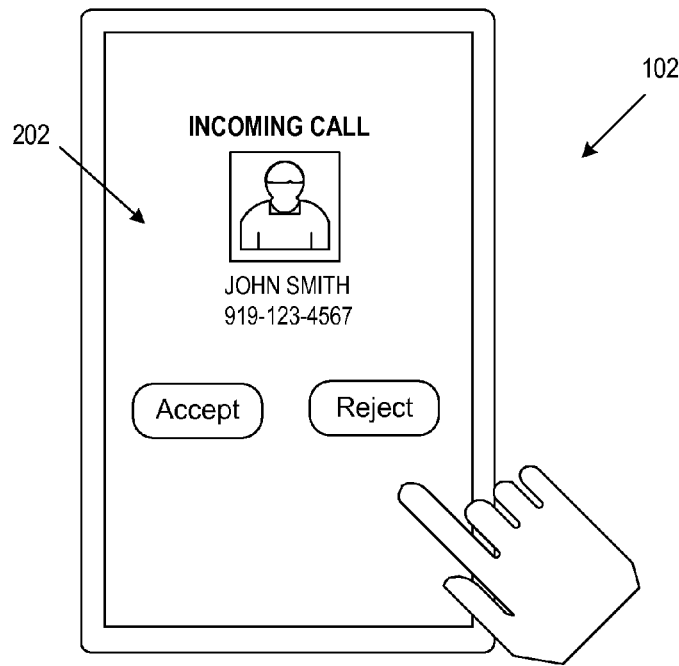
FIG. 2B illustrates another example user interface generated by the call processing interface in the media playback device of FIG. 1.

Note, however, that this is just one example implementation and that other means for receiving user input may be utilized as well. FIG. 2B illustrates another example user interface 202 generated by the call processing interface 115 (FIG. 1) in the media playback device 102 (FIG. 1). As with the example user interface of FIG. 2A, the user interface 202 includes various items, including an alert that informs the user that an incoming call has been received by the communication device 103 (FIG. 1). For this implementation, however, the user specifies how to handle a call by pressing items on a touchscreen interface on the media playback device 102. Note that while the embodiments described above involve the use of a visual alert comprising a user interface for notifying the user of an incoming call, the media playback device 102 may also be configured to vibrate upon an incoming call being received by the communication device 103.

Referring back to FIG. 1, the call processing interface 115 receives the user's selection regarding how to handle the incoming call (e.g., to accept or reject the incoming call) and generates a response to the communication device 103 communicating the user's response. The peripheral interface 119 in the media playback device 102 is executed to facilitate communications with other devices such as the communication device 103. As shown, the peripheral interface 119 may also be executed to establish a connection between the media playback device 102 and an output device 130 such as a wireless headset, which may be, for example, Bluetooth® compatible and capable of supporting multiple simultaneous connections.

The communication interface 125 on the communication device 103 then accepts or rejects the incoming call according to the response received from the media playback device 102. In the event that the user accepts the call, the peripheral interface 129 in the communication device 103 establishes an audio path with the output device 130. At approximately the same time, the media file manager 112 suspends the streaming of media content to the output device 130 in order to allow the user to conduct the call via an audio path between the communication device 103 and the output device 130. Once the call is terminated, the media file manager 112 resumes streaming of the audio content to the output device 130.

Various data is stored in data storage 117 implemented in the media playback device 102 that is accessible to a user of the media playback device 102. The data storage 117 may store such data as contact lists, photos, media files, user profile data, and other personal files. For some embodiments, the data stored in the data storage 117 may be partitioned according to open access data 142 and limited access data 145, where any user of the media playback device 102 can access the open access data 142 while the limited access data 145 is restricted to authorized users. The security module 121 is executed to implement privacy settings and provides restricted access to the limited access data 145 in the data storage 117. The security module 121 functions as a gateway through which authorized users access the limited access data 145.

Figure 3:
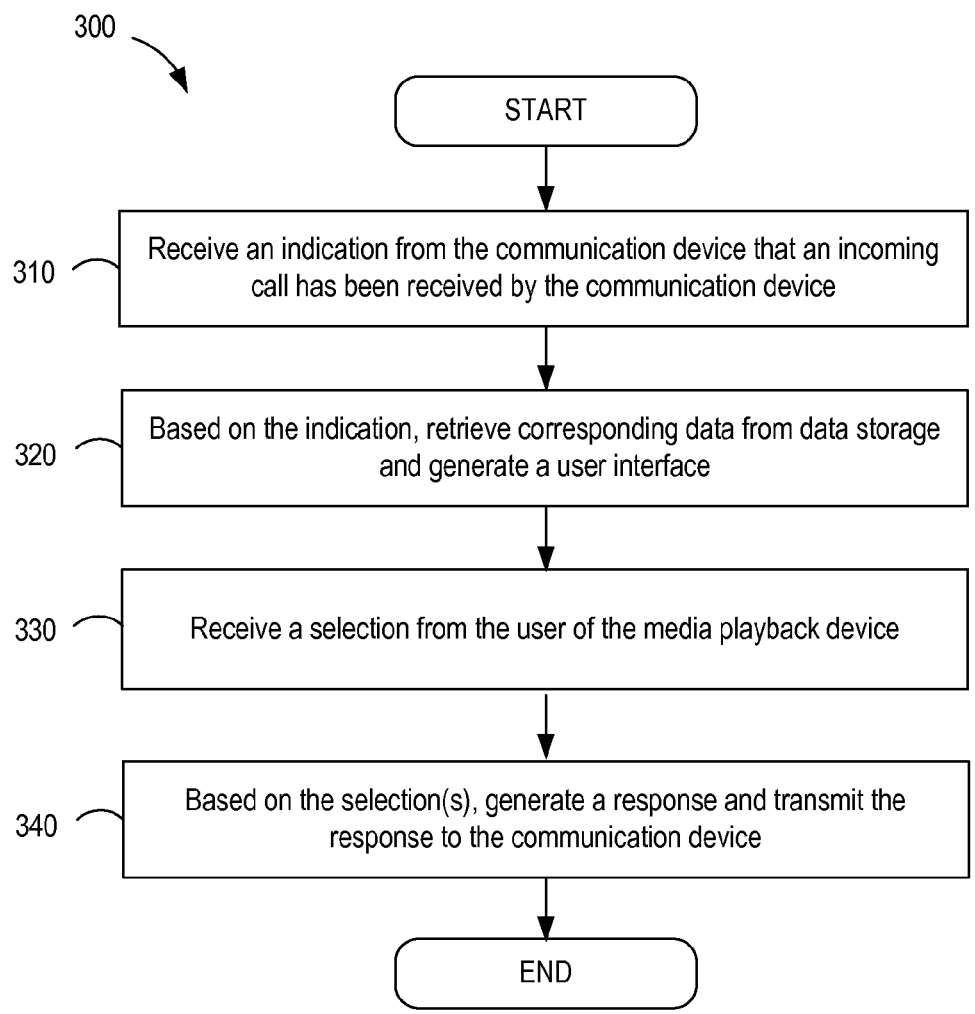
FIG. 3 is a flowchart illustrating examples of functionality implemented as portions of the call processing interface in the media playback device of FIG. 1 according to various embodiments of the present disclosure.

Having described the various components for handling incoming calls, a detailed description of the functionality associated with the various components described in connection with FIG. 1 is now provided. Reference is made to FIG. 3, which is a flowchart 300 in accordance with one embodiment for handling incoming calls via a media playback device 102 (FIG. 1). It is understood that the flowchart 300 of FIG. 3 provides merely an example of the many different types of functional arrangements that may be employed to implement the operation of the call processing interface 115 (FIG. 1) in the media playback device 102. As an alternative, the flowchart of FIG. 3 may be viewed as depicting an example of steps of a method implemented in the media playback device 102 according to one or more embodiments.

An incoming call is received by the communication interface 125 (FIG. 1) in the communication device 103 (FIG. 1). Through the peripheral interface 129 (FIG. 1) in the communication device 103 and the peripheral interface 119 (FIG. 1) in the media playback device 102, the communication device 103 establishes a connection with the media playback device 102. Beginning with block 310, the media playback device 102 receives an indication from the communication device 103 that an incoming call has been received.

In block 320, the media playback device 102 retrieves data corresponding to the incoming call from the data storage 117 (FIG. 1). For some embodiments, the call processing interface 115 receives as part of the indication from communication device 103, caller identification (ID) information relating to the call. Such caller ID information may comprise, for example, the telephone number of the caller originating the incoming call. Based on this information, the call processing interface 115 accesses the data storage 117 to determine whether any data associated with the caller is currently stored in the data storage 117.

Such data may comprise, for example, photos associated with callers. Other data may comprise other contact information relating to the caller and a call history corresponding to the caller. Based on the data retrieved from the data storage 117, the call processing interface 115 generates a user interface 202 (FIG. 2A) rendered on the display 104 (FIG. 1) of the media playback device 102 for providing the user of the media playback device 102 options for handling the incoming call.

In block 330, the call processing interface 115 receives a selection from the user via the user interface 202. Examples of selections by the user may include accepting the incoming call and rejecting the incoming call. As described earlier in connection with FIGS. 2A and 2B, the user interface 202 may include selectable items whereby the user can accept or reject the incoming call received by the communication device 103.

For some embodiments, the call processing interface 115 allows the user to accept or reject the incoming call by manipulating controls 204 (FIG. 2A) on the media playback device 102. In the example user interface 202 shown in FIG. 2A, the user interface 202 includes a graphic depicting the caller (John Smith). For some embodiments, the graphic is stored locally on the media playback device 102 as limited access data 145 (FIG. 1) in the data storage 117 and retrieved by the security module 121, as described in more detail below.

In block 340, the call processing interface 115 generates a response based on the selection received from the user and transmits the response back to the communication device 103. The communication interface 125 then handles the call according to the response sent by the call processing interface 115 in the media playback device 102. Thereafter, the portion of the call processing interface 115 ends.

Figure 4:
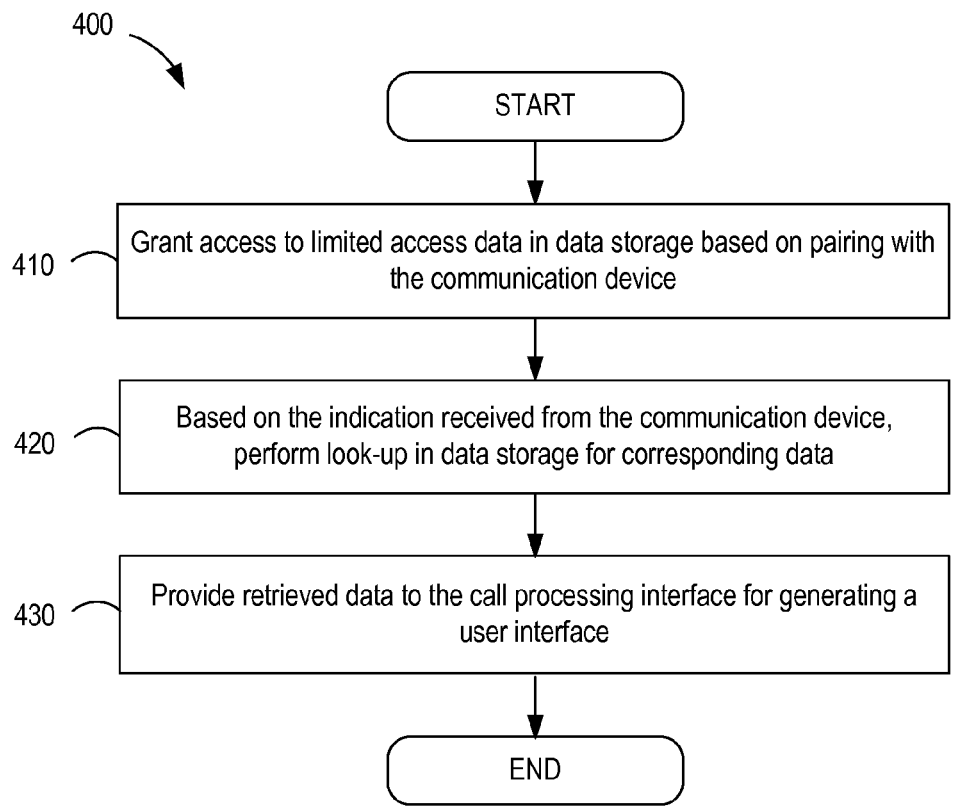
FIG. 4 is a flowchart illustrating examples of functionality implemented as portions of the security module in the media playback device of FIG. 1 according to various embodiments of the present disclosure.

Reference is made to FIG. 4, which is a flowchart 400 in accordance with one embodiment for handling incoming calls via a media playback device 102 (FIG. 1). It is understood that the flowchart 400 of FIG. 4 provides merely an example of the many different types of functional arrangements that may be employed to implement the operation of the security module 121 (FIG. 1) in the media playback device 102. As an alternative, the flowchart of FIG. 4 may be viewed as depicting an example of steps of a method implemented in the media playback device 102 according to one or more embodiments.

Upon receiving an indication from the communication device 103 (FIG. 1) that an incoming call has been received, the call processing interface 115 (FIG. 1) accesses the data storage 117 (FIG. 1) via the security module 121 to retrieve data associated with the caller originating the incoming call for purposes of generating a user interface.

Beginning with block 410, the security module 121 grants access to the limited access data 145 in the data storage 117 based on the communication device 103 currently coupled with the media playback device 102 through the respective peripheral interfaces 119, 129 of the media playback device 102 and the communication device 103. Based on the communication device 103 currently paired with the media playback device 102, the security module 121 determines whether an authorized user is using the media playback device 102 and grants access to the limited access data 145 (FIG. 1) accordingly. For some embodiments, the limited access data 145 may be partitioned according to users such that each user is only able to access certain data within the data storage 117.

In block 420, the security module 121 performs a look-up in the data storage 117 to retrieve data associated with the incoming call. For example, the security module 121 may perform a look-up among contacts of the current user and retrieve a photo, if available, associated with the caller originating the incoming call.

In block 430, the data retrieved by the security module 121 is forwarded to the call processing interface 115, which then generates a user interface 202 (FIG. 2A) using the retrieved data, as described above. Thereafter, the portion of the security module 121 ends.

Figure 5:
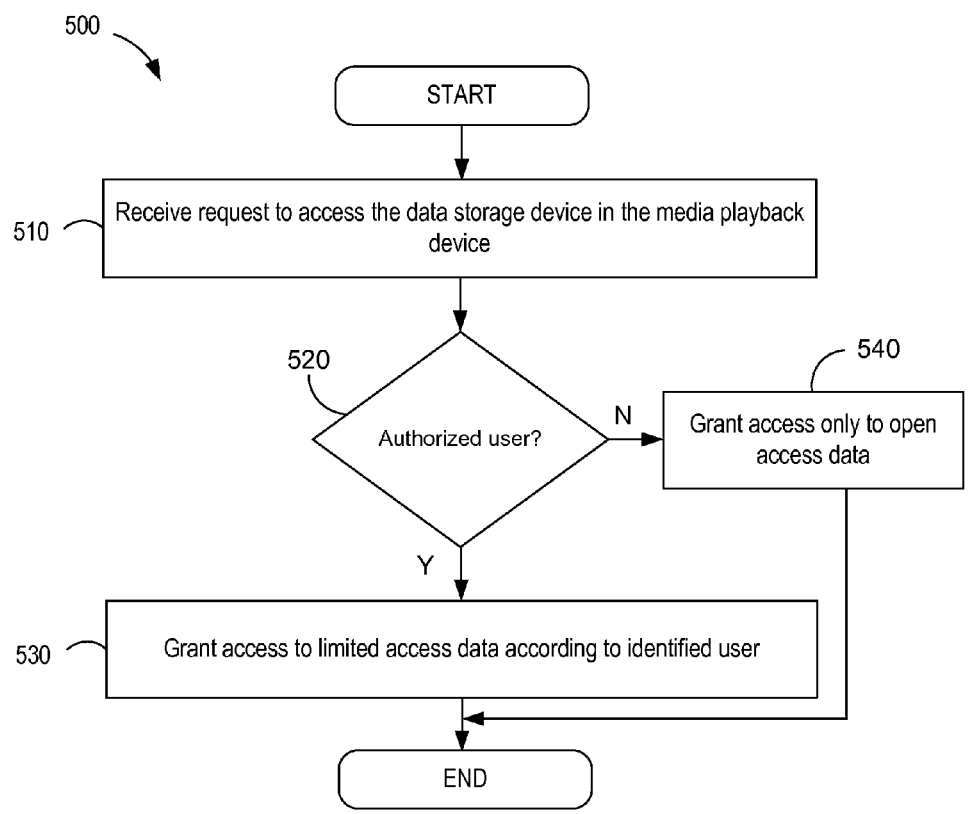
FIG. 5 is a flowchart illustrating examples of functionality implemented as portions of the security module in the media playback device of FIG. 1 according to alternative embodiments of the present disclosure.

Turning now to FIG. 5, shown is a flowchart 500 in accordance with other embodiments for providing restricted access to the data storage 117 (FIG. 1) via the security module 121 (FIG. 1) in the media playback device 102. It is understood that the flowchart 500 of FIG. 5 provides merely an example of the many different types of functional arrangements that may be employed to implement the operation of the security module 121 in the media playback device 102 (FIG. 1). As an alternative, the flowchart of FIG. 5 may be viewed as depicting an example of steps of a method implemented in the media playback device 102 according to one or more embodiments.

In block 510, the media playback device 102 receives a request to access the data storage 117 in the media playback device 102. A user may be attempting to access, for example, contact lists, photos, media files, user profile data, and/or other personal files stored in the data storage 117. For some embodiments, such data may be stored as limited access data 145 (FIG. 1) where only authorized users are allowed to access such data.

In block 520, the security module 121 determines whether the user attempting to access the data storage 117 is an authorized user. The security module 121 may determine whether a user is authorized according to various means. For some embodiments, the security module 121 determines the identity of the user according to the communication device 103

(FIG. 1) currently paired to the media playback device 102. The security module 121 may also be configured to grant access to the limited access data 145 upon successful pairing of the communication device 103 and the media playback device 102 via a Bluetooth® connection. For some embodiments, the security module 121 may determine the identity of the user according to a point-to-point connection with another device via a Wi-Fi Direct connection.

Figure 9:
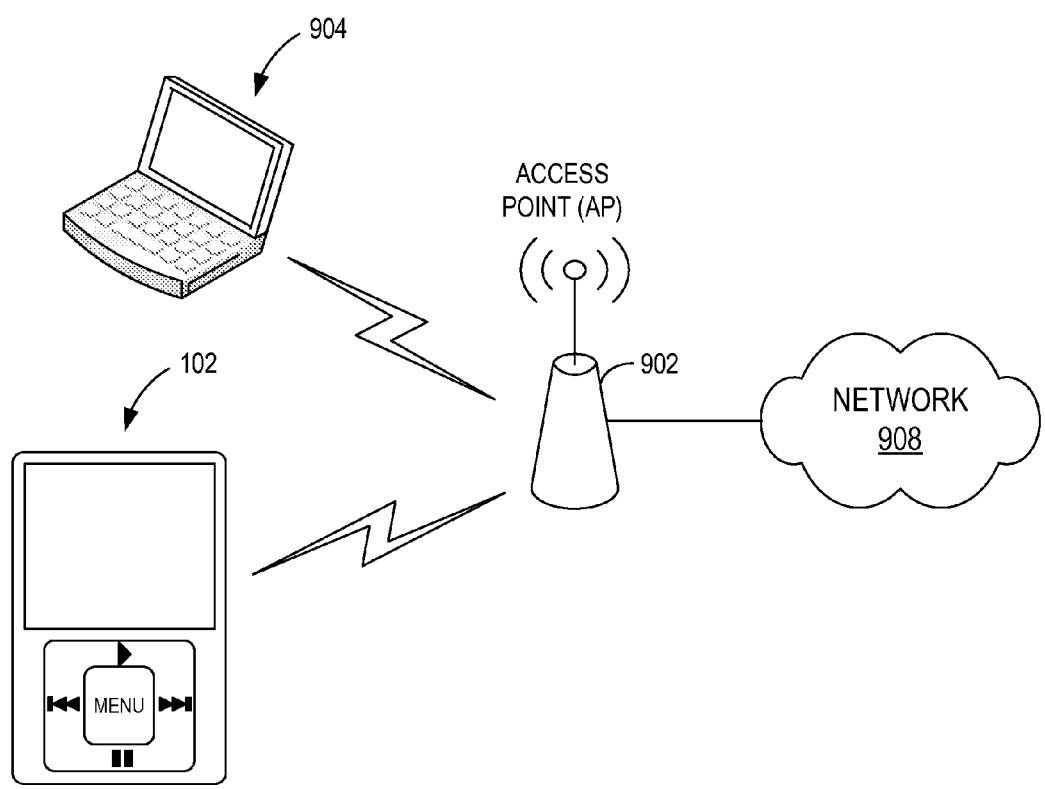
FIG. 9 illustrates the media playback device and a computing device wirelessly coupled via an access point.

For other embodiments, the security module 121 may determine the identity of the user according to connection via an access point. To illustrate, reference is made to FIG. 9. As shown, a media playback device 102 (FIG. 1) and a computing device 904 may be part of an IEEE 802.11 network whereby the devices 102, 904 are wirelessly coupled via an access point 902, which provides access to a network 908 such as the Internet. Based on an identifier (e.g., an IP address), the media playback device 102 may determine the identity of the user of the computing device 904 in determining whether to grant access to the limited access data 145 (FIG. 1) in the data storage 117 (FIG. 1). For other embodiments, the security module 121 may be configured to provide access to the limited access data 145 via a web portal upon validation of user credentials.

Referring back to block 520 in FIG. 5, if the security module 121 determines that the user attempting to access the data storage 117 is an authorized user, the security module 121 proceeds to block 530, where the security module 121 grants access to the limited access data 145 according to the identity of the user. In block 540, if the user is not an authorized user, the security module 121 may be configured to grant access to only the open access data 142 (FIG. 1) in the data storage 117. Note that the limited access data 145 may be partitioned according to users such that different users access different portions of the limited access data 145. The security module 121 thus provides limited access to such personal information as contact lists, call logs, and so on. Thereafter, the portion of the security module 121 ends.

Figure 6:
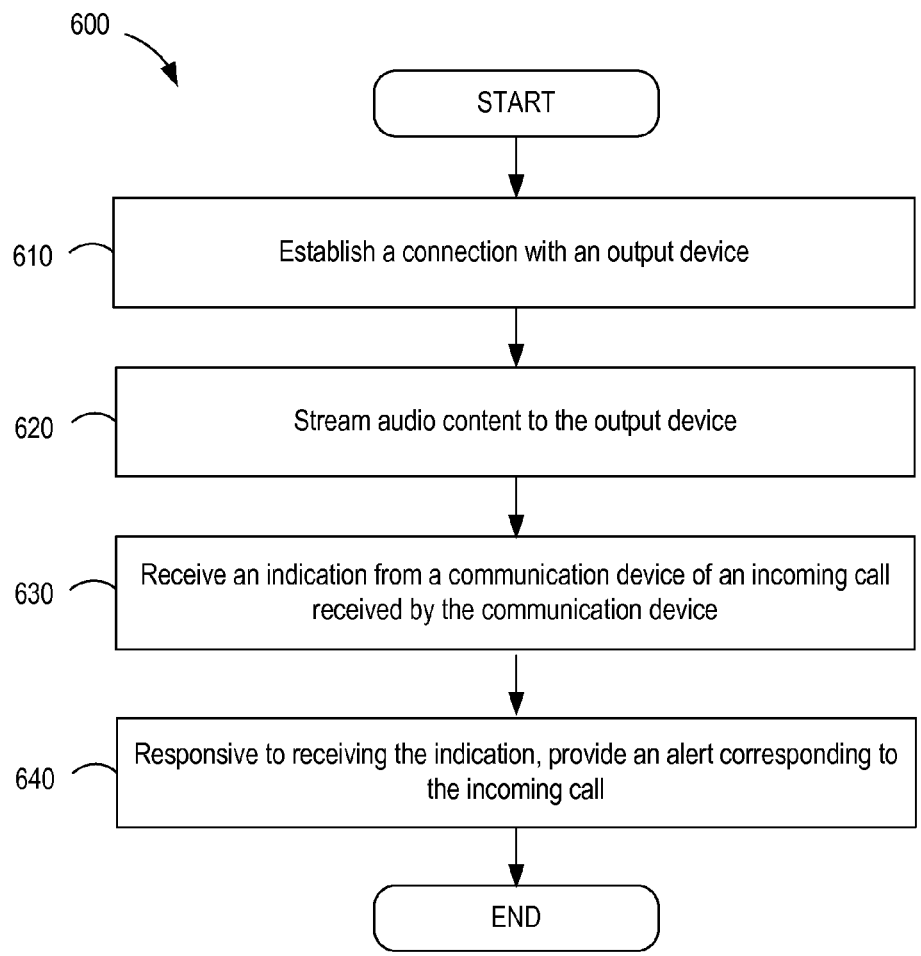
FIG. 6 is a top-level flowchart illustrating examples of functionality implemented as portions of the media playback device of FIG. 1 for handling incoming calls according to various embodiments of the present disclosure.

Reference is made to FIG. 6, which is a flowchart 600 in accordance with one embodiment for handling incoming calls via execution of the various components of the media playback device 102 (FIG. 1). It is understood that the flowchart 600 of FIG. 6 provides merely an example of the many different types of functional arrangements that may be employed to implement the operation of the media playback device 102. As an alternative, the flowchart of FIG. 6 may be viewed as depicting an example of steps of a method implemented in the media playback device 102 according to one or more embodiments.

In accordance with one method implemented in a media playback device 102 for handling incoming calls to a communication device 103 (FIG. 1), the media playback device 102 begins with block 610 and establishes a connection with an output device 130, which may comprise, for example, a Bluetooth® compatible headset.

In block 620, the media playback device 102 streams audio content to the output device 130. In block 630, the media playback device 102 receives an indication from the communication device 103 of an incoming call received by the communication device 103. Based on the contents of the indication, the media playback device 102 proceeds to block 640 and generates an alert corresponding to the incoming call. As described earlier in connection with FIG. 2A, the alert may be embodied as a user interface 202 (FIGS. 2A and 2B) shown on the display 104 (FIG. 1) of the media playback device 102. Alerts embodied as user interfaces 202 may include various items, including the name and number of the calling party and a graphic of the caller originating the incoming call.

Figure 7:
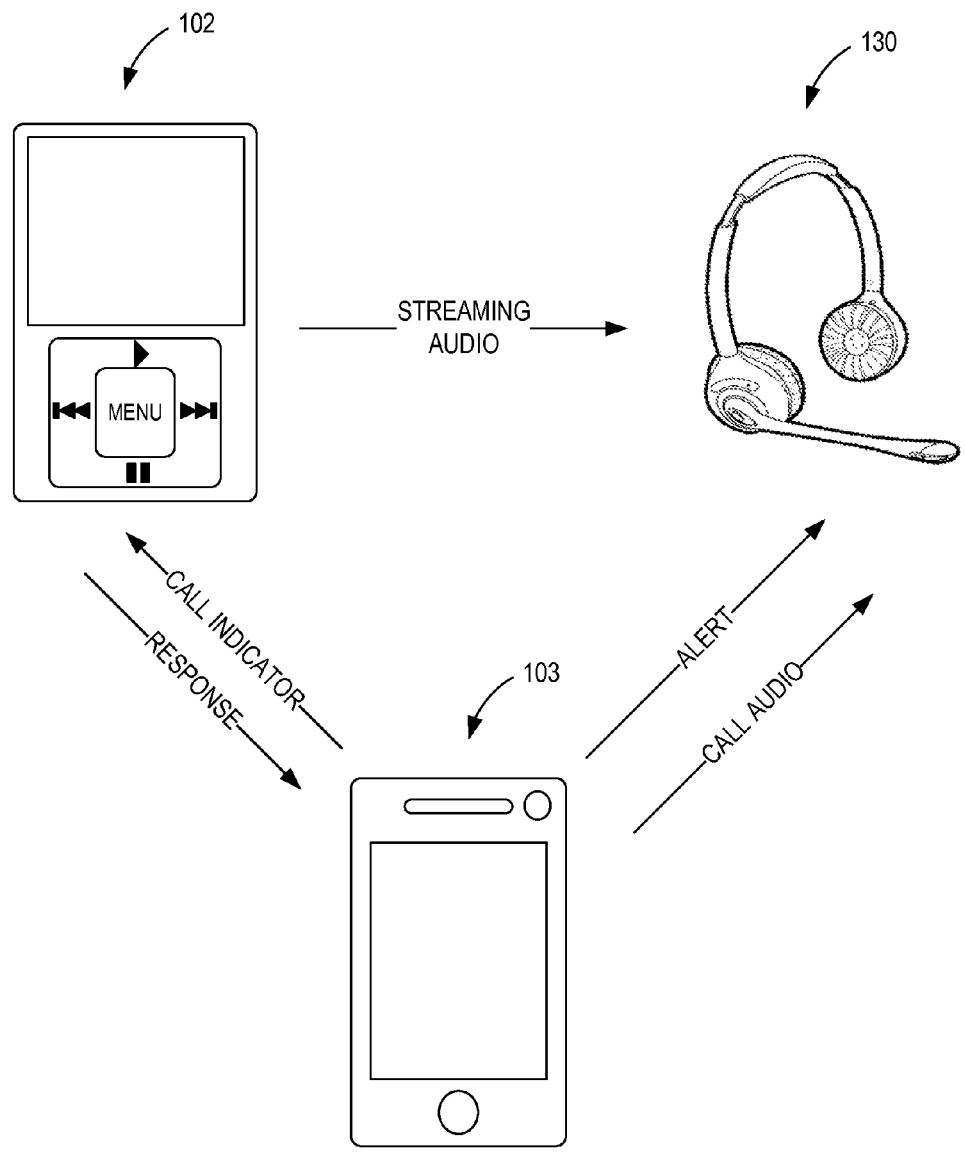
FIG. 7 illustrates the high-level data flow between the media playback device, the communication device, and the output device of FIG. 1.

Reference is made to FIG. 7, which illustrates the high-level data flow between the media playback device 102, the communication device 103, and the output device 130. The media playback device 102 establishes a connection with the output device 130 and streams audio content. The communication device 103 receives an incoming call and sends a call indicator to the media playback device 102, which generates an alert in the form of a user interface 202 (FIGS. 2A and 2B). At the same time, the communication device 103 may also transmit an audio alert (e.g., a ring tone) directly to the output device 130. The user of the output device 130 may therefore receive both a visual alert and an audio alert relating to the incoming call.

The media playback device 102 receives a selection from the user relating to the incoming call. For example, the user may accept or reject the incoming call and specify the desired action by manipulating one or more controls on the media playback device 102. As described earlier in connection with FIG. 2A, the user may, for example, press the PLAY button on the media playback device 102 to accept the incoming call. Alternatively, the user may also interface via a touchscreen on the media playback device 102 (FIG. 2B). Based on the user's selection, the media playback device 102 transmits a response back to the communication device 103.

In the event that the user elects to accept the call, the media playback device 102 suspends streaming of the audio content to the output device 130, and the communication device 103 routes the audio from the incoming call to the output device 130 so that the user can conduct the call. Upon termination of the incoming call, the communication device 103 alerts the media playback device 102, and the media playback device 102 resumes streaming of the audio.

Figure 8:
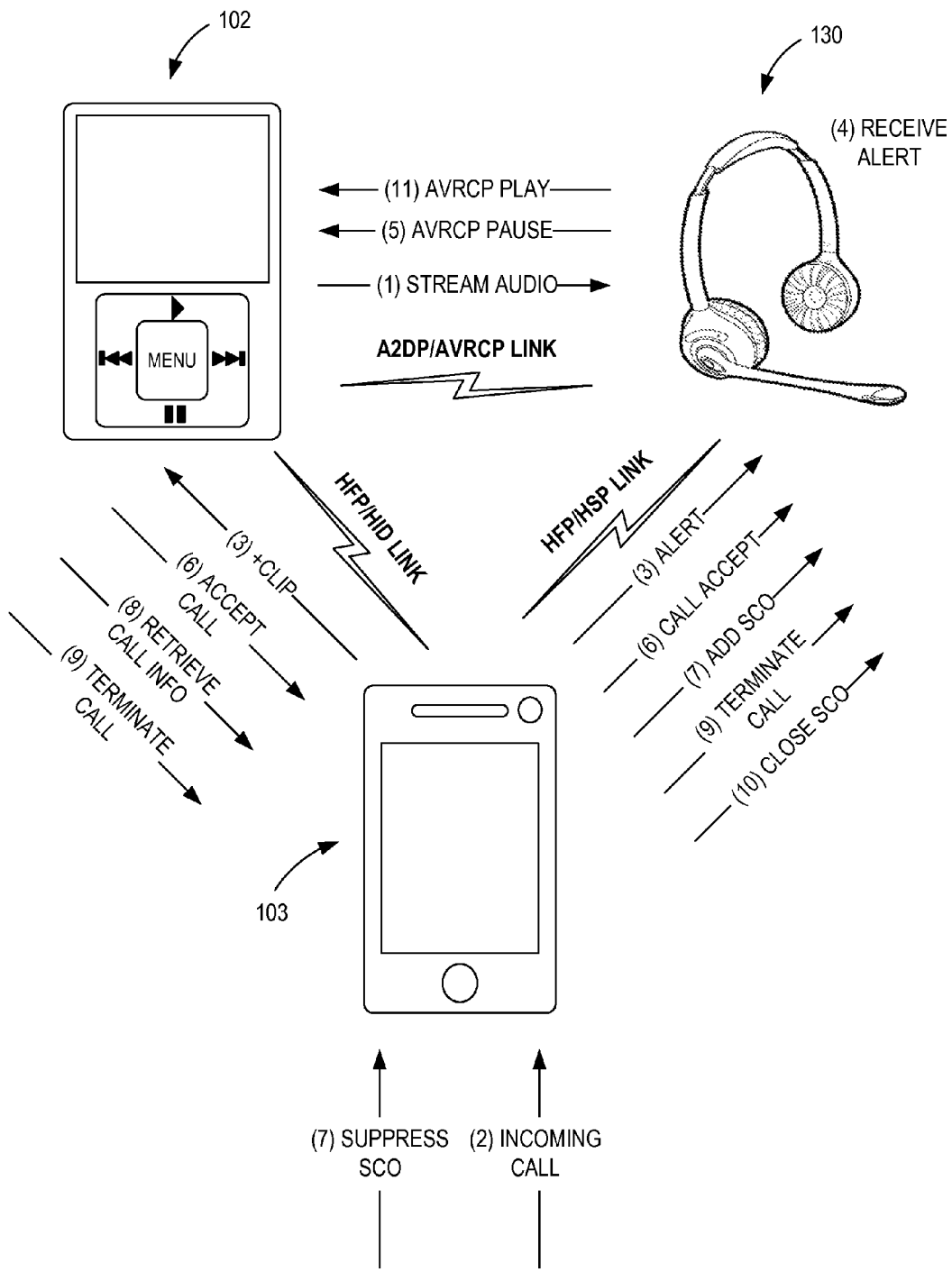
FIG. 8 illustrates the data flow between the media playback device, the communication device, and the output device where the devices are coupled via Bluetooth® connections.

FIG. 8 illustrates the data flow between the media playback device 102, the communication device 103, and the output device 130, where the devices are coupled via Bluetooth® connections. The sequence of events is shown for one embodiment for handling an incoming call via the media playback device 102. For some embodiments, an Advanced Audio Distribution Profile (A2DP)/Audio/Video Remote Control Profile (AVRCP) link is established between the media playback device 102 and the output device 130, whereby the output device 130 is capable of executing basic remote control commands (play, pause, etc.) associated with audio content being streamed from the media playback device 102.

A Hands-Free Profile (HFP)/Human Interface Device Profile (HID) may be established between the media playback device 102 and the communication device 103. A Hands-Free Profile (HFP)/Headset Profile (HSP) link may be established between the communication device 103 and the output device 130. Upon establishing an A2DP/AVRCP connection, the media playback device 102 streams audio content to the output device 130.

As shown, an incoming call is received by the communication device 103, and a +CLIP (Calling Line Identification Presentation) unsolicited response is sent from the communication device 103 to the media playback device 102. At approximately the same time, the communication device transmits an alert (e.g., a ring tone) to the output device 130. For some embodiments, a pause command is transmitted by the output device 130 to the media playback device to suspend streaming of the audio content.

Next, the user accepts the incoming call, and a synchronous connection-oriented (SCO) link is established between the communication device 103 and the output device 130. Call information is retrieved by the media playback device 102 from the communication device 103, and the call is conducted.

The user terminates the call via the media playback device 102 or the output device 130, which then alerts the communication device 103 that the call has been terminated. The communication device 103 closes the SCO link with the output device 130, and playback resumes between the media playback device 102 and the output device 130.

Figure 10:
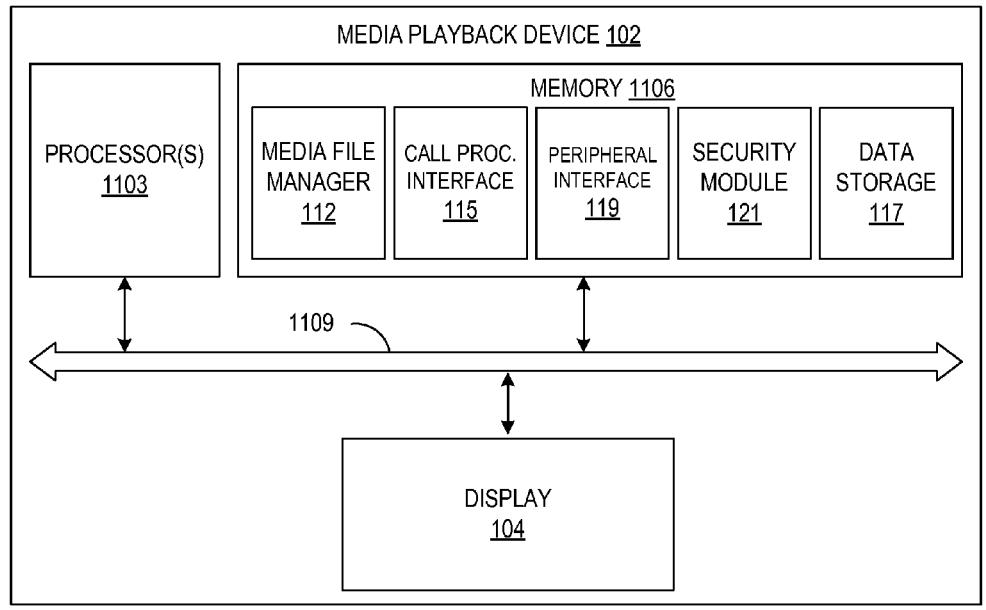
FIG. 10 is a schematic block diagram of the media playback device according to an embodiment of the present disclosure.

With reference to FIG. 10, shown is a schematic block diagram of the media playback device 102 according to an embodiment of the present disclosure. The media playback device 102 includes at least one processor circuit, for example, having a processor 1103 and a memory 1106, both of which are coupled to a local interface 1109. The local interface 1109 may comprise, for example, a data bus with an accompanying address/control bus or other bus structure as can be appreciated.

Stored in the memory 1106 are both data and several components that are executable by the processor 1103. In particular, stored in the memory 1106 and executable by the processor 1103 are the media file manager 112, the call processing interface 115, the peripheral interface 119, the security module 121, and potentially other applications. Also stored in the memory 1106 may be the data storage 117 and other data. In addition, an operating system may be stored in the memory 1106 and executable by the processor 1103.

Figure 11:
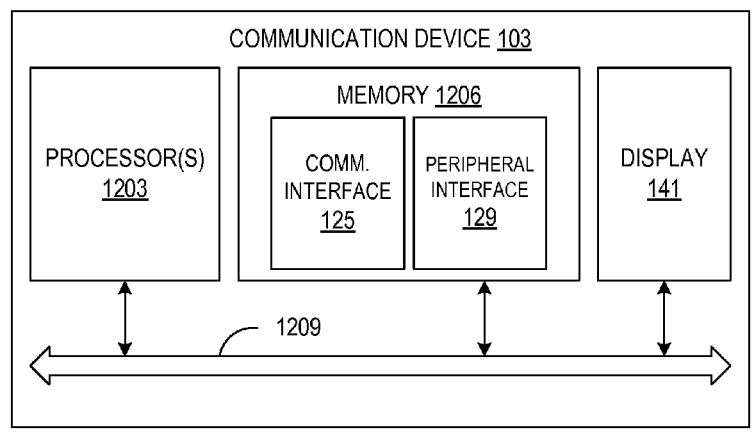
FIG. 11 is a schematic block diagram of the communication device according to an embodiment of the present disclosure.

With reference to FIG. 11, shown is a schematic block diagram of the communication device 103 according to an embodiment of the present disclosure. The communication device 103 includes at least one processor circuit, for example, having a processor 1203 and a memory 1206, both of which are coupled to a local interface 1209. The local interface 1209 may comprise, for example, a data bus with an accompanying address/control bus or other bus structure as can be appreciated.

Stored in the memory 1206 are both data and several components that are executable by the processor 1203. In particular, stored in the memory 1206 and executable by the processor 1203 are the communication interface 125, the peripheral interface 129, and potentially other applications. In addition, an operating system may be stored in the memory 1206 and executable by the processor 1203.

It is understood that there may be other applications that are stored in each of the memories 1106/1206 and are executable by the respective processors 1103/1203 as can be appreciated. Where any component discussed herein is implemented in the form of software, any one of a number of programming languages may be employed.

A number of software components are stored in the respective memories 1106/1206 and are executable by the processors 1103/1203. In this respect, the term executable means a program file that is in a form that can ultimately be run by a respective processor 1103/1203. Examples of executable programs may be, for example, a compiled program that can be translated into machine code in a format that can be loaded into a random access portion of a memory 1106/1206 and run by a processor 1103/1203, source code that may be expressed in proper format such as object code that is capable of being loaded into a random access portion of a memory 1106/1206 and executed by a processor 1103/1203, or source code that may be interpreted by another executable program to generate instructions in a random access portion of one of the memories 1106/1206 to be executed by a respective processor 1103/1203, etc.

An executable program may be stored in any portion or component of a respective memory 1106/1206 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Each of the memories 1106/1206 is defined herein as including both volatile and nonvolatile memory and data storage components. Volatile components are those that do not retain data values upon loss of power. Nonvolatile components are those that retain data upon a loss of power. Thus, each memory 1106/1206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components.

In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each processor 1103/1203 may represent multiple processors and each memory 1106/1206 may represent multiple memories that operate in parallel processing circuits, respectively. In such a case, each local interface 1109/1209 may be an appropriate network that facilitates communication between any two of the multiple processors, between any processor and any of the multiple memories, or between any two memories, etc. Such a local interface 1109/1209 may comprise additional systems designed to coordinate this communication, including, for example, performing load balancing. Each processor 1103/1203 may be of electrical or of some other available construction.

Although the components and applications described herein may be embodied in software or code executed by general purpose hardware as discussed above, as an alternative the same may also be embodied in dedicated hardware or a combination of software/general purpose hardware and dedicated hardware.

If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-6 show an example of functionality associated with implementation of the various components in the system of FIG. 1. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1103 in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor in a computer system or other system. Each may comprise, for example, statements including instructions and declarations that can be fetched from the computer-readable medium and executed by the instruction execution system.

In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs.

Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a media playback device for handling incoming calls to a communication device, comprising:
    establishing, by the media playback device, a connection with an output device;
    streaming, by the media playback device, audio content to the output device, wherein the media playback device comprises a plurality of playback controls;
    receiving, by the media playback device, an indication from a communication device of an incoming call received by the communication device;
    responsive to receiving the indication, providing, by the media playback device, an alert corresponding to the incoming call; and
    responsive to receiving the indication, providing, by the media playback device, a user interface on a display of the media playback device to a user, wherein the user interface comprises a plurality of items each relating to an action for handling the incoming call, wherein for each item displayed on the user interface, an action is assigned to one of the playback controls on the media playback device for invoking the action.

2. The method of claim 1, further comprising receiving, by the media playback device, an input from the user via the user interface, the input comprising a selection among the at least one item.

3. The method of claim 2, further comprising transmitting, by the media playback device, a response to the communication device based on the selection.

4. The method of claim 2, wherein the input comprises one of a selection to accept the call and a selection to reject the call.

5. The method of claim 4, further comprising responsive to the input comprising a selection to accept the call, suspending, by the media playback device, streaming of the audio content to the output device.

6. The method of claim 5, further comprising resuming, by the media playback device, streaming of the audio content to the output device upon the incoming call being terminated.

7. The method of claim 1, wherein the output device comprises a Bluetooth headset.

8. The method of claim 1, wherein the media playback device comprises a portable computing device.

9. The method of claim 1, wherein the media playback device is coupled to the output device via an Advanced Audio Distribution Profile (A2DP) connection, and wherein the communication device is coupled to the media playback device via a Hands-Free Profile (HFP) connection, and wherein the communication device is coupled to the output device via a second HFP connection.

10. The method of claim 1, wherein the alert provided to the output device comprises at least one of a visual alert and an audio alert.

11. The method of claim 10, wherein the visual alert comprises caller identification (ID) information corresponding to the incoming call.

12. The method of claim 11, wherein at least a portion of the caller ID information comprises limited access data stored on the media playback device, wherein the limited access data is accessed according a connection between the media playback device and the communication device.

13. A method implemented in a handheld media playback device for handling incoming calls to a communication device, comprising:
    establishing, by the media playback device, a connection with an output device, wherein the connection complies with both a Bluetooth Advanced Audio Distribution Profile (A2DP) profile and an Audio Video Remote Control Profile (AVRCP) profile;
    streaming, by the handheld media playback device, audio content to an output device via an A2DP connection, wherein the media playback device comprises a plurality of playback controls;
    receiving, by the handheld media playback device, a caller indication (ID) packet from a communication device corresponding to an incoming call received by the communication device; and responsive to receiving the indication, providing, by the handheld media playback device, a user interface on a display of the handheld media playback device, the user interface including a visual alert corresponding to the incoming call, the visual alert including information in the caller ID packet, wherein the user interface displays a plurality of items each relating to an action for handling the incoming call, wherein for each item displayed on the user interface, an action is assigned to one of the playback controls on the media playback device for invoking the action.

14. The method of claim 13, wherein the output device comprises a Bluetooth enabled hands-free device.

15. The method of claim 13, wherein the caller ID packet comprises a +CLIP (Calling Line Identification Presentation) unsolicited response.

16. The method of claim 13, further comprising receiving, by the handheld media playback device, a selection from a user relating to handling of the incoming call.

17. The method of claim 13, further comprising responsive to a selection comprising acceptance of the incoming call, suspending, by the handheld media playback device, streaming of the audio content to the output device.

18. A system, comprising:
a handheld media playback device comprising a plurality of playback controls; and
an application executable in the handheld media playback device, the application comprising:
logic that streams audio content to a hands-free device;
logic that receives an indication from a communication device of an incoming call received by the communication device;
logic that provides, responsive to receiving the indication, an alert to the output device corresponding to the incoming call;
logic that provides a user interface on a display of the handheld media playback device, wherein the user interface comprises a plurality of items corresponding to actions for handling the incoming call, wherein for each item displayed on the user interface, an action is assigned to one of the playback controls on the media playback device for invoking the action; and
logic that receives a selection of one of the items.

19. The system of claim 18, wherein the streaming of audio content to the hands-free device is performed via an Advanced Audio Distribution Profile (A2DP) connection, and wherein receiving the indication is performed via a Hands-Free Profile (HFP) connection.

20. The system of claim 18, further comprising logic for sending a response to the communication device based on the selection.

21. The system of claim 18, further comprising logic for suspending streaming of the audio content to the hands-free device based on the selection of one of the items.

22. The system of claim 18, further comprising logic that retrieves limited access data according to a connection established between the handheld media playback device and the communication device.

* * * * *